US010162555B2

(12) United States Patent
Kandamuthan (10) Patent No.: US 10,162,555 B2
(45) Date of Patent: *Dec. 25, 2018

(54) DEDUPLICATING SNAPSHOTS ASSOCIATED WITH A BACKUP OPERATION

(71) Applicant: EMC IP Holding Company LLC, Hopkinton, MA (US)

(72) Inventor: Nirmala Kandamuthan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/971,675

(22) Filed: May 4, 2018

(65) Prior Publication Data
US 2018/0314454 A1 Nov. 1, 2018

Related U.S. Application Data

(63) Continuation of application No. 14/304,616, filed on Jun. 13, 2014, now Pat. No. 9,990,156.

(51) Int. Cl.
*G06F 3/06* (2006.01)
*G06F 17/30* (2006.01)

(52) U.S. Cl.
CPC .......... *G06F 3/0641* (2013.01); *G06F 3/065* (2013.01); *G06F 3/0608* (2013.01); *G06F 3/0673* (2013.01); *G06F 17/30156* (2013.01)

(58) Field of Classification Search
None
See application file for complete search history.

(56) References Cited

U.S. PATENT DOCUMENTS

| 7,472,242 | B1 | 12/2008 | Deshmukh |
| 7,734,591 | B1 | 6/2010 | Mercier |
| 8,190,836 | B1 | 5/2012 | Zheng |
| 8,738,870 | B1* | 5/2014 | Balasubramanian ... G06F 11/14 711/161 |
| 9,442,806 | B1 | 9/2016 | Bardale |
| 2011/0167221 | A1 | 7/2011 | Pangal |
| 2011/0225130 | A1 | 9/2011 | Tokoro |
| 2012/0017060 | A1 | 1/2012 | Kapanipathi |
| 2012/0084518 | A1 | 4/2012 | Vijayan |
| 2012/0221817 | A1* | 8/2012 | Yueh ..................... G06F 3/0608 711/162 |
| 2016/0210308 | A1* | 7/2016 | Shekhar ........... G06F 17/30174 |

OTHER PUBLICATIONS

The UNIX and Internet Fundamentals HOWTO, Low-Level Disk and File System Structure, 2007.

* cited by examiner

*Primary Examiner* — Prasith Thammavong
*Assistant Examiner* — Edmund H Kwong
(74) *Attorney, Agent, or Firm* — Van Pelt, Yi & James LLP (57) ABSTRACT

Deduplicating snapshot associated with a backup operation is disclosed, including: performing a backup operation including by generating a plurality of snapshots; maintaining, at a source system, deduplication data corresponding to one or more data blocks that have already been written to backup media during the backup operation; and using the deduplication data to deduplicate backup data across the plurality of snapshots.

20 Claims, 8 Drawing Sheets

DEDUPLICATING SNAPSHOTS ASSOCIATED WITH A BACKUP OPERATION

CROSS REFERENCE TO OTHER APPLICATIONS

This application is a continuation of co-pending U.S. patent application Ser. No. 14/304,616 entitled DEDUPLICATING SNAPSHOTS ASSOCIATED WITH A BACKUP OPERATION filed Jun. 13, 2014 which is incorporated herein by reference for all purposes.

BACKGROUND OF THE INVENTION

An image-based backup operation stores a backup image of source data in data storage (e.g., disks) onto backup storage (e.g., tapes). The backup image includes data blocks as a basic backup unit. A data block may be a block of a file or a directory. In some cases, the backup image includes one or more snapshots.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of deduplicating snapshots associated with a backup operation are described herein. A backup operation is performed by generating a plurality of snapshots. Deduplication data corresponding to one or more data blocks that have already been written to backup media during the backup operation is stored at the backup source system. The deduplication data is used to deduplicate backup data across the plurality of snapshots.

Figure 1:
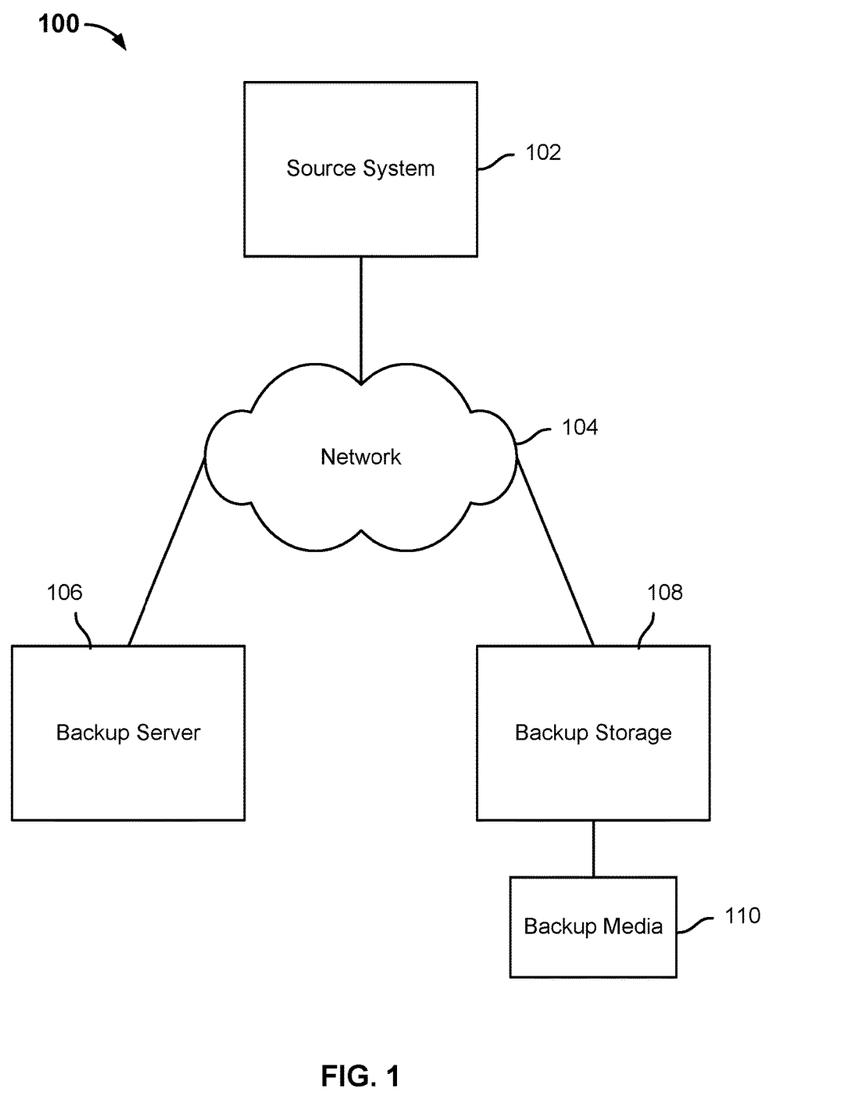
FIG. 1 is a diagram that shows an embodiment of a system for deduplicating snapshots associated with a backup operation.

FIG. 1 is a diagram that shows an embodiment of a system for deduplicating snapshots associated with a backup operation. In the example, system 100 includes source system 102, network 104, backup server 106, backup storage 108, and backup media 110. Network 104 includes high-speed data networks and/or telecommunications networks. Source system 102, backup server 106, and backup storage 108 are configured to communicate to each other over network 104.

Backup server 106 is configured to facilitate performance of backing up data stored at source system 102 to backup storage 108. In some embodiments, backup storage 108 backs up data at backup media 110. For example, backup media 110 comprises one or more tape drives. In some embodiments, backup server 106 is configured to communicate to (e.g., a backup application executing at) source system 102 an indication to initiate a backup operation with respect to a set of data stored at source system 102. For example, the indication to initiate the backup operation can include a command associated with initiating a full backup or an incremental backup, data that identifies the set of data to be backed up at source system 102, and/or a point-in-time at which the backup operation is to begin. For example, the indication to initiate the backup operation may be generated in response to a user input.

Source system 102 is configured to perform a backup operation in response to an indication received from backup server 106 to initiate a backup operation. Source system 102 is configured to identify the set of data (e.g., that is described in the indication) associated with the backup operation. In some embodiments, the identified set of data comprises one or more storage areas. In some embodiments, a storage area comprises a volume of storage. In various embodiments, a "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. In some embodiments, the backup operation to be performed on the identified set of data comprises an image-based backup. An image-based backup comprises a backup that results in a (e.g., point in time) image of the files, directories, operating system, and/or application configurations, for example, that are included in the source data associated with the backup operation. In various embodiments, an image-based backup is performed on a data block by data block basis. In some embodiments, a "data block" refers to a specific physical area of storage. In some embodiments, a "data block" may be a block of a file or a directory.

Performing a backup operation on one or more volumes of storage comprises generating a backup image to be stored at backup storage 108. In various embodiments, the backup image comprises one or more point-in-time images, hereinafter "snapshots." In some embodiments, a snapshot is generated for each storage area (e.g., volume) that is included in the backup operation. Put another way, a snapshot represents a point-in-time state of a corresponding storage area. Conventionally, one or more storage areas at a source system that are involved in a backup operation are backed up in their entirety at each backup operation event. As such, common data blocks that may exist across such storage areas associated with the same backup operation are typically redundantly sent to and backed up at backup storage 110. Embodiments of deduplicating snapshots across a backup operation are described herein.

In various embodiments, in a backup operation, source system 102 is configured to maintain a set of deduplication data associated with that backup operation that identifies data blocks that have already been sent to and backed up at backup storage 108. In some embodiments, the set of deduplication data stores at least identifiers derived from each data block (or set of multiple data blocks) that has already been backed up at backup storage 108. In various embodiments, an "identifier" of a data block comprises metadata associated with the data block and that two data blocks associated with the same identifier are determined to be the same data block. For example, an identifier of a data block is the disk block number.

For each data block of a volume to be backed up at source system 102, source system 102 is configured to determine whether the data block under consideration has already been backed up at backup storage 108 by comparing an identifier associated with the data block with the identifiers included in the set of deduplication data. If a matching identifier can be found in the set of deduplication data, then it is determined that the data block under consideration has already been backed up at backup storage 108 and therefore, a representation of the data block is sent to backup storage 108 to be stored in the current snapshot instead of the underlying data (e.g., the content) of the data block. In some embodiments, the representation of the data block comprises a link (or other reference) to the data block at a location (e.g., within another snapshot) at backup storage 108/backup media 110.

Otherwise, if a matching identifier cannot be found in the set of deduplication data, then it is determined that the data block under consideration has not already been backed up at backup storage 108 and therefore, the underlying data (e.g., the content) of the data block is sent to backup storage 108 to be stored in the snapshot. In the event that the underlying data of the data block is sent to backup storage 108 to be stored in the snapshot, the set of deduplication data is updated to include the identifier of the data block. As such, in some embodiments, a snapshot generated for a certain backup operation at backup storage 108/backup media 110 includes actual data blocks and/or links to locations in other snapshots associated with the same backup operation at which data blocks are stored.

Backup storage 106 is configured to receive data to be backed up in a backup operation and to write the data to a snapshot associated with the backup operation stored at backup media 110. For example, backup storage 106 is configured to receive data from source system 102. In some embodiments, backup storage 106 is configured to receive either a data block or a representation of a data block to be stored in a snapshot associated with a volume depending on the deduplication determination made at the source (e.g., source system 102) of the data. In some embodiments, after storing a received data block to backup media 110, backup storage 108 is configured to send a confirmation message to source system 102 to indicate the successful backup of the data block and also a location (e.g., a particular entry) in a snapshot of the backup operation in which the data block can be found.

By determining at source system 102 whether a data block included in a backup operation has already been backed up at backup storage 108 in a snapshot associated with the same backup operation, the underlying data of a duplicate data block can be prevented from being sent over network 104 to backup storage 108. Instead, a representation of the duplicate data block that comprises a relatively lightweight amount of data can instead be sent over network 104 to backup storage 108. As such, performing deduplication across snapshots associated with a backup operation can reduce the amount of storage spaced needed for each backup operation on backup media 110.

The following is an example of identifying data blocks that are to be backed up: A disk block number is an identifier associated with a data block in backup storage 108. For example, each data block has a fixed size, e.g., 4 kilobytes. These data blocks are stored in one or more snapshots of a volume. The snapshots may include all of the snapshots of the volume that are currently stored in backup storage 108 or one or more specific snapshots selected by a client. Each data block may include a snapshot identifier to identify its membership in a snapshot.

Metadata blocks describe attributes of data blocks. The metadata may include information about the type (e.g., regular, directory) of the file/directory, the size of the file/directory, time stamps (e.g., access and/or modification time), and ownership of the file/directory. In some embodiments, metadata blocks corresponding to data blocks that are stored in one or more snapshots associated with a backup operation are also stored in the one or more snapshots. Metadata blocks stored in the one or more snapshots may be used to perform a restore operation of the data backed up in that backup operation. For example, the metadata blocks stored in the snapshots can be used to identify which data blocks are associated with which file and/or directory. For example, each metadata block includes an inode, such as a directory inode or a file mode. Each mode has an identification number (e.g., an inode number) and associated attributes including the type of inode (such as a directory inode or a file inode). A directory inode contains a list of filenames and the corresponding inode numbers of those files having the filenames. A file inode contains a list of disk block numbers that identify the data blocks owned by the corresponding file. The metadata blocks are a logical representation of a file system structure and, therefore, are independent of on-disk file system format. Each metadata block may include a snapshot identifier to identify its membership in a snapshot. Further, the computation of the metadata blocks and the writing of data blocks to a backup image can be executed concurrently to speed up the backup process.

In various embodiments, snapshots stored at backup storage 108 do not include any data blocks that are common to any other snapshot associated with the same backup operation. In some embodiments, snapshots stored at backup storage 108 include only the data blocks that have been changed since a previously generated snapshot associated with the same backup operation. Thus, there is no duplication of data blocks in a backup image comprising one or more snapshots associated with the same backup operation. With respect to metadata blocks, in some embodiments, only the metadata blocks corresponding to the data blocks that are stored with one or more snapshots associated with the same backup image are stored, and, therefore, there is also no duplication of the metadata blocks in the backup image. The metadata blocks for each of the backed up snapshots are stored in their entirety for increased speed during data restoration. While disk block numbers and inodes are described in the example above, other example techniques of identifying data blocks may be used in actual implementation.

In some embodiments, backup server 106 is configured to initiate a restore of a backup data associated with a point-in-time to source system 102. For example, either backup server 106 and/or source system 102 is configured to determine the backup operation with which the point-in-time is associated and contact backup storage 108 to facilitate the restore operation. In some embodiments, the one or more snapshots associated with the determined backup operation can be located at backup media 110 and used to perform the restore to source system 102. In some embodiments, to restore a located snapshot, each entry of the snapshot is read and the associated data block is restored. If the entry comprises the underlying data associated with a data block, then the data block is read and copied to source system 102. However, if the entry comprises a representation of (e.g., a link to) a data block in another snapshot, then the data block is located in the other snapshot, read from the other snapshot, and copied to source system 102. In some embodiments, metadata blocks that are stored in a snapshot can be used to determine which data blocks belong to which file and/or directory at source system 102 during the restore operation.

Figure 2:
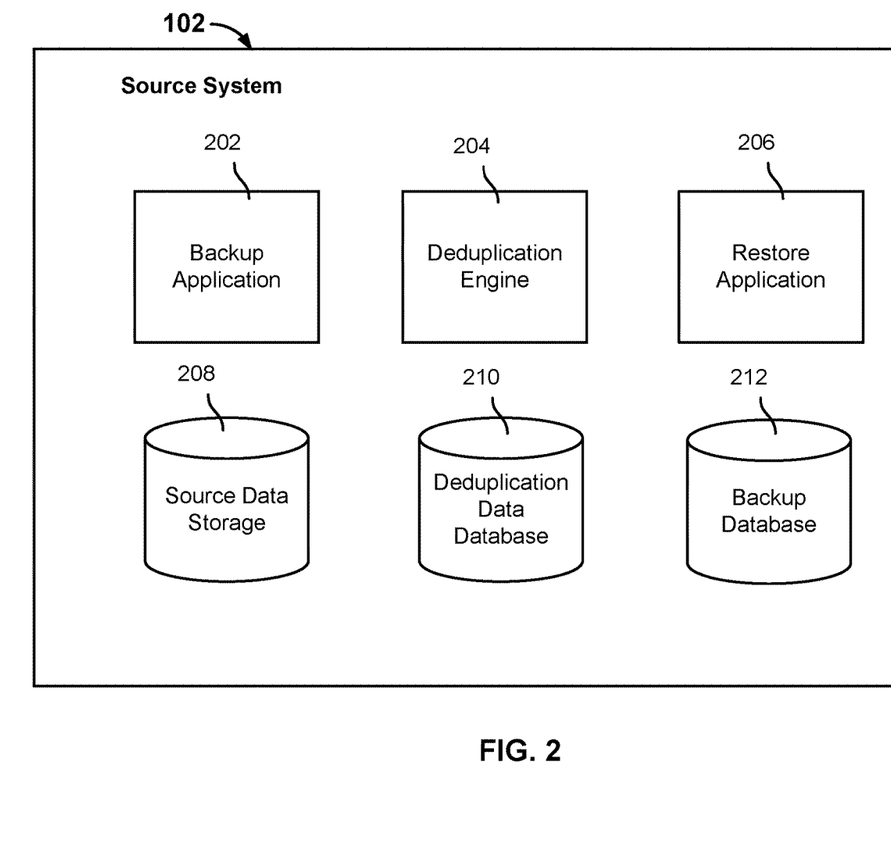
FIG. 2 is a diagram showing an example of a source system.

FIG. 2 is a diagram showing an example of a source system. In some embodiments, source system 102 of system 100 of FIG. 1 is implemented with the example of FIG. 2. In the example, the source system includes backup application 202, deduplication engine 204, restore application 206, source data database 208, deduplication data database 210, and backup database 212. In some embodiments, each of backup application 202, deduplication engine 204, and restore application 206 is implemented using one or both of hardware and software. In some embodiments, each of deduplication data database 210 and backup database 212 is implemented using one or more databases. In some embodiments, source data storage 208 is implemented using one or more hard disks.

Backup application 202 is configured to receive indications to perform a backup operation on source data stored at source data storage 208. In some embodiments, an indication to perform a backup operation is received from a backup server (e.g., backup server 106 of system 100 of FIG. 1). In various embodiments, the backup operation comprises an image-based backup. In some embodiments, backup application 202 comprises an agent that is configured to communicate with the backup server to perform backup operations on source data stored at source data storage 208. In some embodiments, an indication to perform a backup operation identifies a set of source data (e.g., including one or more storages areas) stored at source data storage 208 on which backup is to be performed and specifies whether the backup is a full backup or an incremental backup. A full backup comprises backing up all data blocks of the set of source data and an incremental backup comprises backing up only the data blocks of the set of source data that have been modified added since the immediately previous backup. For example, after one full backup is performed on a set of source data, the subsequent backup may comprise an incremental backup.

In some embodiments, backup application 202 is configured to store attributes associated with each backup operation. For example, stored attributes associated with each backup operation include a point-in-time associated with when the backup operation was performed, data indicating whether the backup operation is a full backup or an incremental backup, identifying data of the set of source data (e.g., the one or more volumes) that was included in the backup operation, identifying data (e.g., a save set ID) associated with the backup operation, a size of the backed up data associated with the backup operation, and identifying data associated with that one or more snapshots that comprise the backup image associated with the backup operation stored at the backup storage.

Source data storage 208 is configured to store the content (e.g., underlying data) of data blocks associated with one or more storage areas. In some embodiments, source data storage 208 is also configured to store metadata (e.g., metadata blocks) corresponding to the content (e.g., data blocks). In some embodiments, each storage area is a volume of source data storage 208. Source data storage 208 is configured to store an identifier associated with each data block of each storage area. In various embodiments, the identifier comprises a piece of metadata associated with the data block. In some embodiments, the identifier of a data block is derived from the content of the data block. For example, an identifier comprises a disk block number. In some embodiments, a snapshot is configured to be generated at the backup storage for each storage area (e.g., volume) that is included in a backup operation.

Deduplication engine 204 is configured to perform deduplication on the data blocks of the set of source data associated with a backup operation to send to a backup storage (e.g., backup storage 108 of system 100 of FIG. 1). For each backup operation, deduplication engine 204 is configured to maintain a set of deduplication data stored at deduplication data database 210. The set of deduplication data associated with a backup operation comprises metadata (e.g., identifiers) associated with data blocks of the set of source data associated with the backup operation that have been sent to and backed up at the backup storage. For example, an identifier of a data block comprises the disk block number associated with the data block. Deduplication engine 204 is configured to determine whether the content of a data block of a particular storage area (e.g., volume) of the set of source data or a representation that refers to an existing copy of the data block at the backup storage should be sent to the backup storage and stored in a snapshot associated with that storage area.

In various embodiments, deduplication engine 204 is configured to determine whether a data block under consideration has already been backed up at the backup storage by comparing an identifier associated with the data block with the identifiers included in the set of deduplication data. If a matching identifier can be found in the set of deduplication data, then it is determined that the data block under consideration has already been backed up at the backup storage and therefore, a representation of the data block is sent to the backup storage to be stored in the snapshot instead of the underlying data of the data block. In some embodiments, the representation of the data block comprises a link (or other reference) to the data block at a location (e.g., within another snapshot) at the backup storage. Otherwise, if a matching identifier cannot be found in the set of deduplication data, then it is determined that the data block under consideration has not already been backed up at the backup storage and therefore, the underlying data of the data block is sent to the backup storage to be stored in the snapshot. In the event that the underlying data of the data block is sent to the backup storage to be stored in the snapshot, the set of deduplication data is updated to include the identifier of the data block. In some embodiments, the set of deduplication data is also updated to include a location in another snapshot (e.g., the snapshot corresponding to a different snapshot other than the snapshot corresponding to the storage area that the data block is from) of the same backup operation in which the data block has been previously stored. For example, if snapshots A, B, and C are currently being generated at the backup storage and a data block that is from a volume that corresponds to snapshot C is found to have an identifier that matches an identifier of a duplicate data block that was previously stored at snapshot A, then a link to the location of the data block within snapshot A can be written into the entry associated with that data block in snapshot C.

In some embodiments, after the backup operation is completed, deduplication engine 204 is configured to delete the set of deduplication data from deduplication data database 210 that was maintained for the backup operation.

Restore application 206 is configured to receive indications to perform restore operations of backup data associated with a point in time to source data storage 208. In some embodiments, an indication to perform a restore operation is received from a backup server (e.g., backup server 106 of system 100 of FIG. 1). In some embodiments, an indication to perform the restore operation includes a specified point-in-time associated with backup data that should be restored. In some embodiments, backup database 212 is searched for a backup operation whose attributes include a point-in-time data that matches that of the received indication. Then, the other attributes of the matching backup operation stored at backup database 212 can be used to locate the one or more snapshots corresponding to the matching backup operation that are stored at the backup media accessible by the backup storage. In some embodiments, the backup storage is configured to read the entries of each snapshot associated with the matching backup operation and send to restore application 206 the backed up data blocks associated with the matching backup operation for restore application 206 to store to source data store 208.

Figure 3:
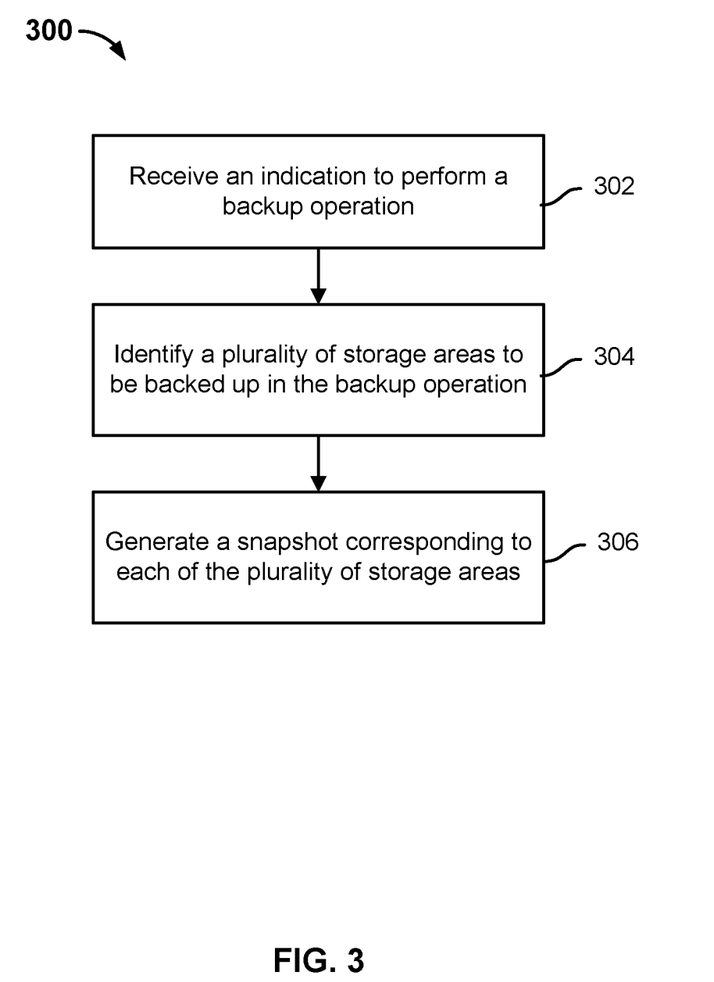
FIG. 3 is a flow diagram showing an embodiment of a process of performing a backup operation at a source system.

FIG. 3 is a flow diagram showing an embodiment of a process of performing a backup operation at a source system. In some embodiments, process 300 is implemented at system 100 of FIG. 1. Specifically, in some embodiments, process 300 is implemented at source system 102 of system 100 of FIG. 1.

At 302, an indication to perform a backup operation. For example, the indication includes data identifying one or more storage areas of the source system to be included in the backup operation and whether the backup operation comprises a full backup or an incremental backup. For example, the indication is configured to be generated (e.g., by a backup server) in response to a user configured condition (e.g., a backup operation is to be performed each night at midnight) being met. At 304, a plurality of storage areas to be backed up in the backup operation is identified. For example, the storage areas to be included in the backup operation are volumes. At 306, a snapshot corresponding to each of the plurality of storage areas is generated. A snapshot is generated to capture the state of each corresponding storage area at the time of the backup operation. As will be described below, data blocks can be deduplicated across the snapshots of the same backup operation.

Figure 4:
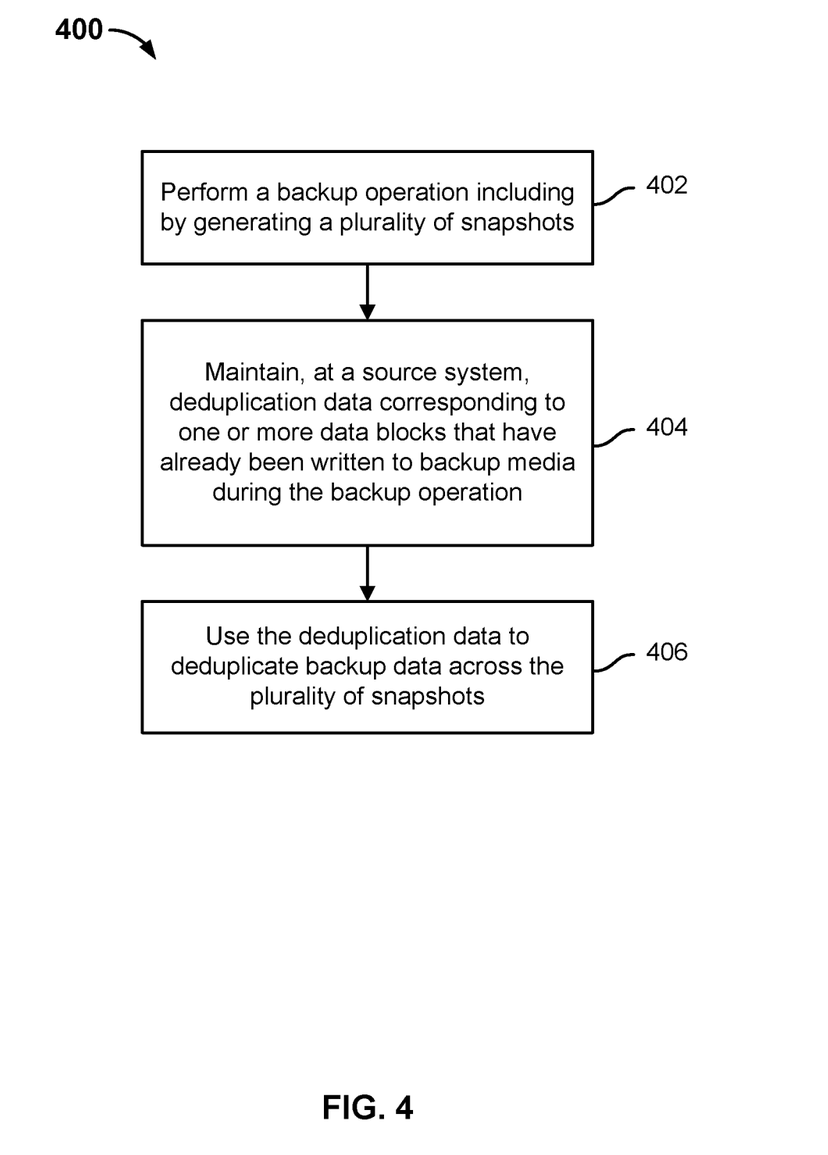
FIG. 4 is a flow diagram showing an embodiment of a process of deduplicating snapshots associated with a backup operation at a source system.

FIG. 4 is a flow diagram showing an embodiment of a process of deduplicating snapshots associated with a backup operation at a source system. In some embodiments, process 400 is implemented at system 100 of FIG. 1. Specifically, in some embodiments, process 400 is implemented at source system 102 of system 100 of FIG. 1.

At 402, a backup operation is performed by generating a plurality of snapshots. A snapshot is generated by the source system sending data blocks associated with a storage area to back up to the backup storage. At the backup storage, the data blocks are written to the snapshot corresponding to the storage area.

At 404, deduplication data corresponding to one or more data blocks that have already been written to backup media during the backup operation is maintained at a source system. The source system stores and updates a set of deduplication data for each backup operation. The set of deduplication data for a backup operation includes identifiers of data blocks that have already been written to backup media during that backup operation. As such, the set of deduplication data for a backup operation includes identifiers of data blocks that have been already backed up on the backup media. In some embodiments, for each data block for which an identifier is included in the set of deduplication data, the data block's location in a specified snapshot of the backup operation and/or the data block's location on the backup media is also stored in the set of deduplication data. For example, the set of deduplication data comprises a data structure.

At 406, the deduplication data is used to deduplicate backup data across the plurality of snapshots. For each data block that the source system considers whether to send to the backup storage to store with the current snapshot corresponding to a storage area (e.g., volume) associated with the data block, the source system first compares the data block's identifier with the set of deduplication data associated with that backup operation. In various embodiments, if a matching identifier can be found in the set of deduplication data, then the data block is determined to be a duplicate of one that has already been written to the backup media as part of another snapshot and instead of sending the underlying data (e.g., the content) of the data block to the backup storage, a lighter weight representation of the data block is sent to backup storage. In some embodiments, the representation of the data block includes a (e.g., soft or hard) link to the location in a specified snapshot of the backup operation and/or the location on the backup media at which that data block is stored. The representation of the data block is then written to the corresponding snapshot at the backup media. Otherwise, if a matching identifier cannot be found in the set of deduplication data, then the data block is determined to not be a duplicate of one that has already been written to the backup media as part of another snapshot and therefore, the underlying data (e.g., the content) of the data block is sent to the backup storage and the set of deduplication data is updated to include the identifier of that data block.

In some embodiments, in response to sending the underlying data (e.g., the content) of the data block is sent to the backup storage, the location in which that data block has been stored in the current snapshot and/or the location in which that data block has been written to the backup media is returned from the backup storage to the source system and such location information is added with the identifier of that data block to the set of deduplication data.

Figure 5:
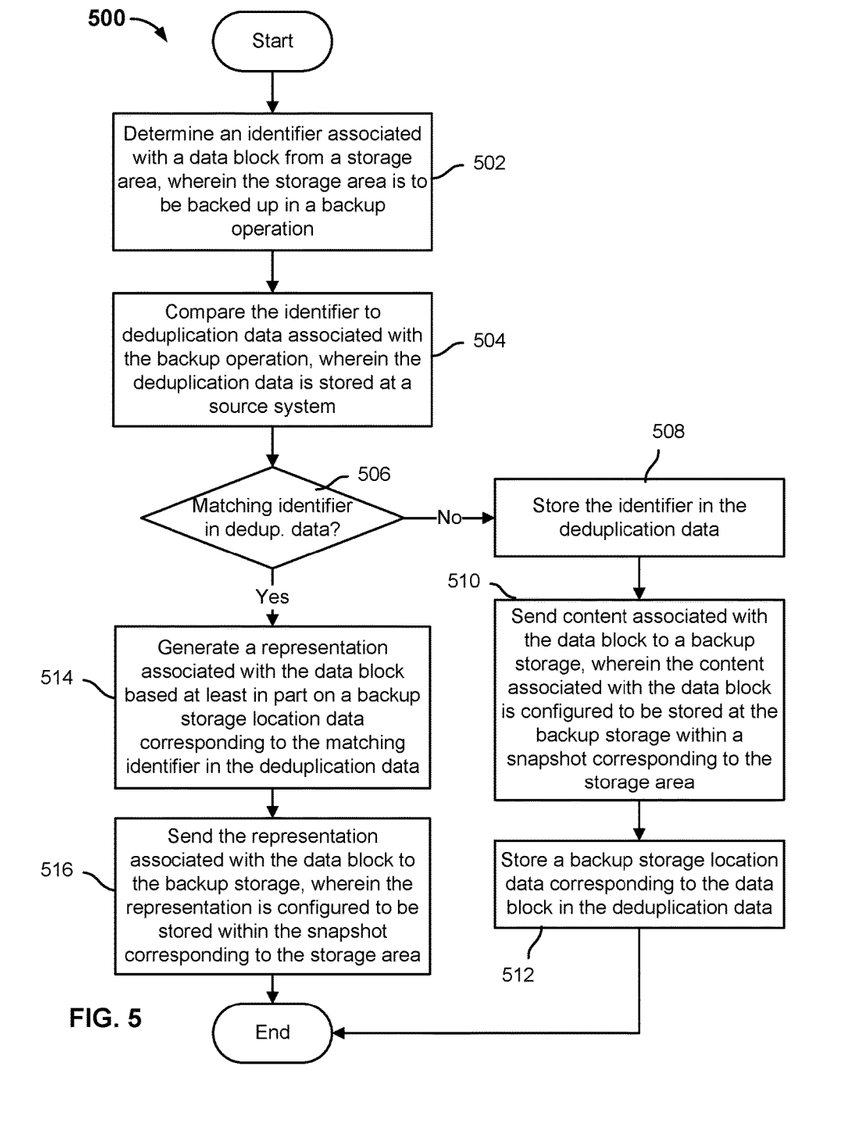
FIG. 5 is a flow diagram showing an example of a process of deduplicating snapshots associated with a backup operation at a source system.

FIG. 5 is a flow diagram showing an example of a process of deduplicating snapshots associated with a backup operation at a source system. In some embodiments, process 500 is implemented at system 100 of FIG. 1. Specifically, in some embodiments, process 500 is implemented at source system 102 of system 100 of FIG. 1. In some embodiments, process 400 of FIG. 4 is implemented with the example of FIG. 5.

Process 500 describes an example process of determining at a source system whether a duplicate of a data block to back up in a backup operation has already been written to backup media during the same backup operation.

At 502, an identifier associated with a data block from a storage area is determined, wherein the storage area is to be backed up in a backup operation. The storage area (e.g., volume) is included in a current backup operation. At 504, the identifier is compared to deduplication data associated with the backup operation, wherein the deduplication data is stored at a source system. For example, the set of deduplication data associated with the backup operation includes identifiers corresponding to data blocks from one or more storage areas at the source system that have already been written to the backup media in one backup operation. For example, an identifier of a data block is the disk block number of the data block. At 506, it is determined whether a matching identifier corresponding to the identifier can be found in the deduplication data.

In the event that a matching identifier cannot be found in the deduplication data, a duplicate of the data block is determined to not have already been written to the backup media and control is transferred to 508. At 508, the identifier is stored in the deduplication data. At 510, content associated with the data block is sent to a backup storage, wherein the content associated with the data block is configured to be stored at the backup storage within a snapshot corresponding to the storage area. As such, when a duplicate of the data block is determined to not have already been written to the backup media, the underlying data of the data block is sent to be stored in the snapshot at the backup media. At 512, a backup storage location data corresponding to the data block is stored in the deduplication data. In some embodiments, in response to sending the underlying data (e.g., the content) of the data block to the backup storage, the location in which that data block has been stored in the current snapshot and/or the location in which that data block has been written to the backup media is returned from the backup storage to the source system and such location information is added with the identifier of that data block to the set of deduplication data.

Otherwise, in the event that a matching identifier can be found in the deduplication data, a duplicate of the data block is determined to have already been written to the backup media and control is transferred to 514. At 514, a representation associated with the data block is generated based at least in part on a backup storage location data corresponding to the matching identifier in the deduplication data. For example, the backup storage location data corresponding to the matching identifier describes the location on the backup storage at which the previously written duplicate data block can be found. For example, the location on the backup storage at which the previously written duplicate data block can be found comprises a location in another snapshot or a location on the backup media. For example, the representation of the data block comprises a link (or other reference) to the data block stored at a specified location (e.g., entry) within another snapshot associated with the same backup operation at the backup media. For example, the link comprises a soft link (e.g., a uniform resource locator (URL)) or a hard link (e.g., a physical path). At 516, the representation associated with the data block is sent to the backup storage, wherein the representation is configured to be stored within the snapshot corresponding to the storage area. As such, when a duplicate of the data block is determined to have already been written to the backup media, a representation of the data block is sent to be stored in the snapshot at the backup media instead.

Figure 6:
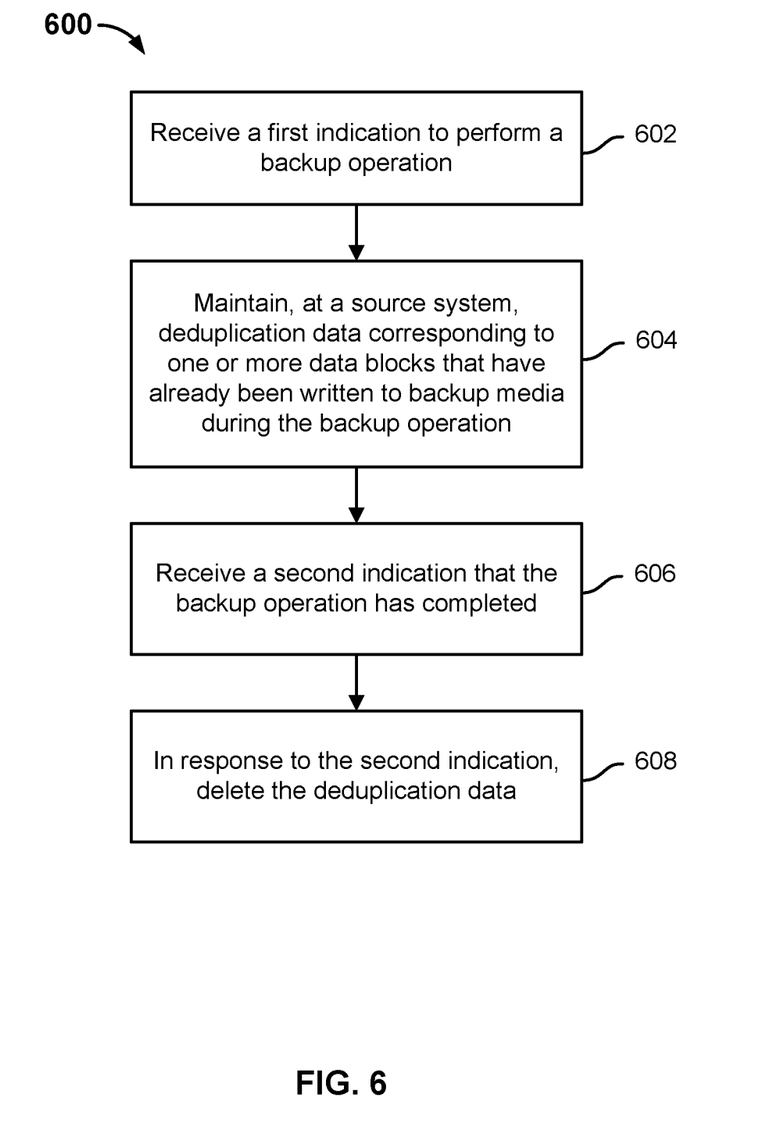
FIG. 6 is a flow diagram showing an embodiment of a process of maintaining a set of deduplication data associated with a backup operation.

FIG. 6 is a flow diagram showing an embodiment of a process of maintaining a set of deduplication data associated with a backup operation. In some embodiments, process 600 is implemented at system 100 of FIG. 1. Specifically, in some embodiments, process 600 is implemented at source system 102 of system 100 of FIG. 1.

Process 600 shows an example of creating and maintaining a set of deduplication data to use for each backup operation and deleting the set of deduplication data once the backup operation is determined to be completed. The set of deduplication data is deleted after the backup operation is complete because the set of deduplication data is used to perform deduplication within snapshots generated for a particular backup operation and is therefore not needed for a subsequent backup operation. Instead, a new set of deduplication data can be created and maintained for the subsequent backup operation.

At 602, a first indication to perform a backup operation is received. At 604, deduplication data corresponding to one or more data blocks that have already been written to backup media during the backup operation is maintained at a source system. The deduplication data is maintained/updated as described above. For example, the deduplication data is included in a data structure. At 606, a second indication that the backup operation has completed is received. At 608, in response to the second indication, the deduplication data is deleted.

Figure 7:
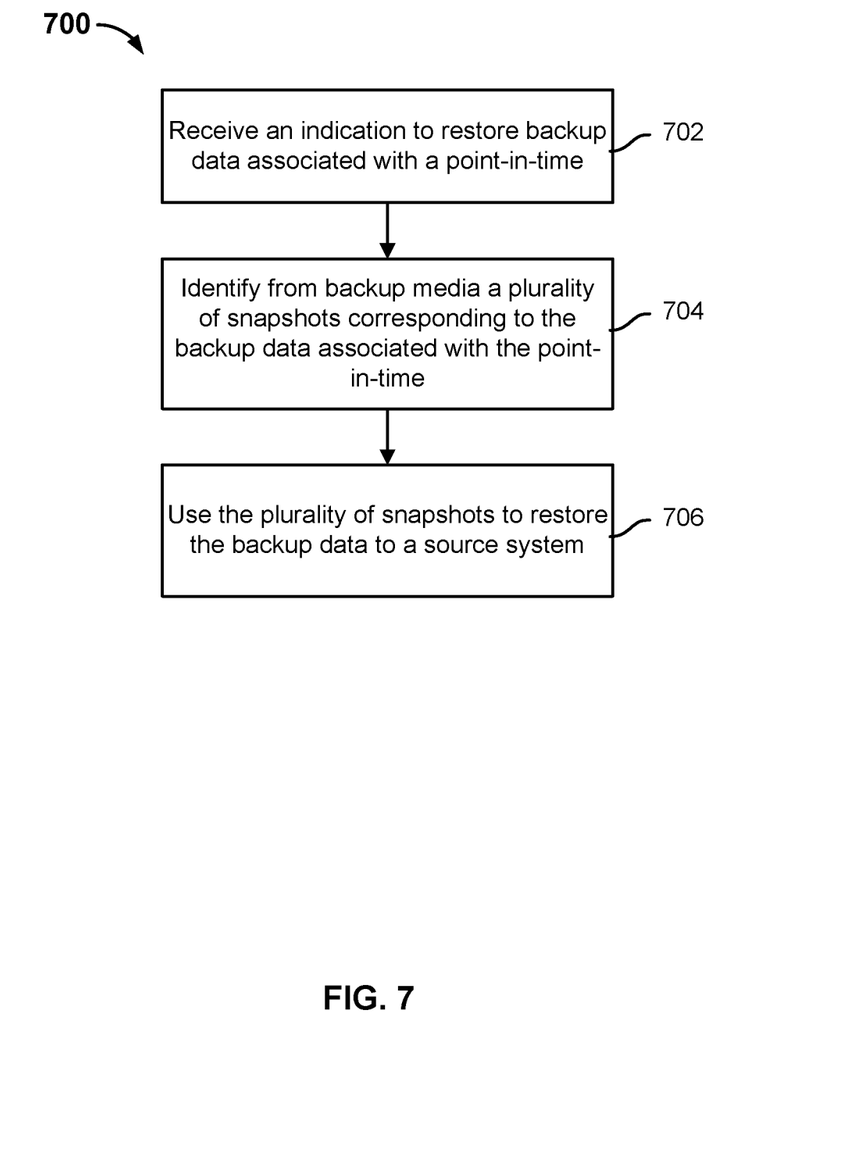
FIG. 7 is a flow diagram showing an embodiment of a process of restoring backup data associated with a point-in-time.

FIG. 7 is a flow diagram showing an embodiment of a process of restoring backup data associated with a point-in-time. In some embodiments, process 700 is implemented at system 100 of FIG. 1. Specifically, in some embodiments, process 700 is implemented at backup storage 106 of system 100 of FIG. 1.

At 702, an indication to restore backup data associated with a point-in-time is received. In some embodiments, the indication to restore backup data is generated based on a user input. Because backup operations are each associated with a point-in-time state of the source, the indication to restore backup data can specify the desired point-in-time backup data to copy back onto the source system. For example, the restore operation can be performed in a disaster recovery process of restoring lost or damaged data at the source system and the specified point-in-time can be a time that is prior to the event that led to the loss or damage to data at the source system. At 704, a plurality of snapshots corresponding to the backup data associated with the point-in-time is identified from backup media. In some embodiments, based on data stored at the backup storage and/or the source system, a completed backup operation (e.g., associated with a save set ID) corresponding to the point-in-time specified in the indication is determined and the snapshots corresponding to that backup operation are identified on the backup media. In various embodiments, the snapshots stored for the backup operation had been deduplicated using a process such as process 400 of FIG. 4 and process 500 of FIG. 5, as described above. At 706, the plurality of snapshots is used to restore the backup data to a source system. The entries of each snapshot are read and used to restore the data blocks associated with the snapshot to the source system.

Figure 8:
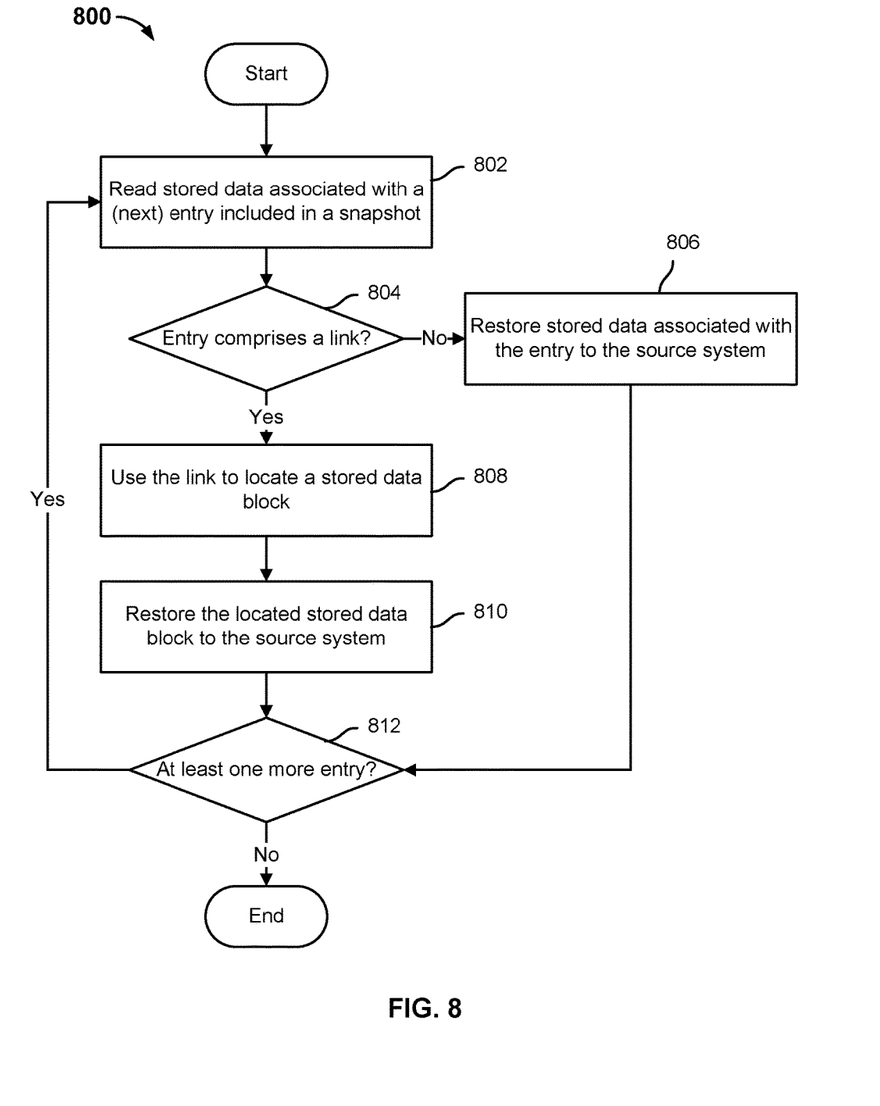
FIG. 8 is a flow diagram showing an example of a process of restoring a snapshot.

FIG. 8 is a flow diagram showing an example of a process of restoring a snapshot. In some embodiments, process 800 is implemented at system 100 of FIG. 1. Specifically, in some embodiments, process 800 is implemented at backup storage 106 of system 100 of FIG. 1. In some embodiments, step 706 of process 700 of FIG. 7 is implemented at least in part using the process of FIG. 8.

Process 800 shows an example of restoring a snapshot of one or more snapshots corresponding to a point-in-time that was specified in an indication to initiate a restore operation.

At 802, stored data associated with a (next) entry included in a snapshot is read. In various embodiments, the snapshot had been deduplicated using a process such as process 400 of FIG. 4 and process 500 of FIG. 5, as described above.

At 804, it is determined whether the entry comprises a link. In the event that the entry does not comprise a link, the data stored in the entry is determined to be the content of a data block that was included in a storage area (e.g., volume) at the source system at the point-in-time corresponding to the snapshot. For example, the entry comprises a link if the format of the data associated with the entry matches a format associated with a link. As such, at 806, stored data associated with the entry is restored to the source system. Restoring stored data associated with the entry to the source system includes copying the stored data associated with the entry to an appropriate location of the source system.

Otherwise, in the event that the entry does comprise a link, the data stored in the entry is determined to be a link to the content of a data block that was included in a storage area (e.g., volume) at the source system corresponding to the point-in-time of the snapshot. In some embodiments, the link to the content of a data block comprises a link to a location in another snapshot associated with the same point-in-time backup operation and/or a location on the backup media at which the content of the data block is stored. As such, at 808, the link is used to locate a stored data block. For example, the link is used to find a location not in the current snapshot at which the data block associated with the entry is stored. At 810, the located stored data block is restored to the source system. For example, the content of the data blocks can be located from another snapshot and/or a location on the backup media.

At 812, it is determined whether at least one more entry is included in the snapshot. In the event that there is at least one other entry included in the snapshot, control is returned to 802 and the next entry in the snapshot is examined. Otherwise, if there are not more entries included in the snapshot, process 800 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication to perform a backup operation on a plurality of storage areas of a source system;
in response to the indication, perform the backup operation including by generating a plurality of snapshots corresponding to respective ones of the plurality of storage areas associated with the backup operation;
maintain, at the source system, deduplication data corresponding to one or more data blocks that have already been written to backup media during the backup operation, wherein the deduplication data comprises a plurality of identifiers corresponding to respective ones of data blocks that have already been written to the backup media; and
use the deduplication data, at the source system, to deduplicate backup data across the plurality of snapshots associated with the backup operation, wherein to use the deduplication data comprises to compare, at the source system, an identifier associated with a data block to back up in a first snapshot included in the plurality of snapshots to the plurality of identifiers,
wherein in response to a determination that a matching identifier is not found in the plurality of identifiers:
determine, at the source system, that the data block has not already been written to the backup media;
send, from the source system, to a backup storage underlying data of the data block to be stored as an entry associated with the data block in the first snapshot at the backup media at the backup storage; and
send, from the source system, to the backup storage a metadata block corresponding to the data block, wherein the metadata block is to be stored in the first snapshot at the backup media at the backup storage, wherein the metadata block is configured to be used to determine to which file or directory, or both, the data block belongs; and
a memory coupled to the processor and configured to store the deduplication data.

2. The system of claim 1, wherein the plurality of snapshots is configured to be stored at the backup media.

3. The system of claim 1, wherein a storage area included in the plurality of storage areas comprises a volume of storage.

4. The system of claim 1, wherein the identifier associated with the data block comprises a disk block number.

5. The system of claim 1, wherein the backup operation comprises a full backup.

6. The system of claim 1, wherein the backup operation comprises an incremental backup.

7. The system of claim 1, wherein the deduplication data is configured to be deleted subsequent to completion of the backup operation.

8. The system of claim 1, wherein the processor is further configured to restore the first snapshot, including by reading the entry associated with the data block included in the first snapshot:
in response to a first determination that the entry includes underlying data of the data block:
restore stored data associated with the entry associated with the data block to the source system; and
use the stored metadata block corresponding to the data block to determine to which file, directory, or both the data block belongs; and
in response to a second determination that the entry associated with the data block includes a representation of the data block:

use the representation included in the entry to locate a location at the backup media to restore data stored at the location at the backup media to the source system; and use the stored metadata block corresponding to the data block to determine to which file, directory, or both the data block belongs.

9. The system of claim 1, wherein the determination comprises a first determination and wherein, in response to a second determination that the matching identifier is included in the deduplication data, the processor is further configured to:

determine, at the source system, that the data block has already been written to the backup media; and send, from the source system, to the backup storage a representation of the data block to be stored as the entry associated with the data block in the first snapshot on the backup media at the backup storage, wherein the representation of the data block comprises associating data to a location at the backup media to which the data block was previously written, wherein the representation of the data block is determined based at least in part on information stored in the deduplication data, wherein the data block was previously written to the location at the backup media for a second snapshot of the plurality of snapshots.

10. The system of claim 9, wherein the representation of the data block comprises at least one of a hard link or a soft link.

11. The system of claim 1, wherein the metadata block comprises an inode.

12. A method, comprising:

receiving an indication to perform a backup operation on a plurality of storage areas of a source system;

in response to the indication, performing the backup operation including by generating a plurality of snapshots corresponding to respective ones of the plurality of storage areas associated with the backup operation;

maintaining, at the source system, deduplication data corresponding to one or more data blocks that have already been written to backup media during the backup operation, wherein the deduplication data comprises a plurality of identifiers corresponding to respective ones of data blocks that have already been written to the backup media; and using the deduplication data, at the source system, to deduplicate backup data across the plurality of snapshots associated with the backup operation, wherein to use the deduplication data comprises to compare, at the source system, an identifier associated with a data block to back up in a first snapshot included in the plurality of snapshots to the plurality of identifiers, wherein in response to a determination that a matching identifier is not found in the plurality of identifiers:

determining, at the source system, that the data block has not already been written to the backup media;

sending, from the source system, to a backup storage underlying data of the data block to be stored as an entry associated with the data block in the first snapshot at the backup media at the backup storage; and sending, from the source system, to the backup storage a metadata block corresponding to the data block, wherein the metadata block is to be stored in the first snapshot at the backup media at the backup storage, wherein the metadata block is configured to be used to determine to which file or directory, or both, the data block belongs.

13. The method of claim 12, wherein the identifier associated with the data block comprises a disk block number.

14. The method of claim 12, wherein the deduplication data is configured to be deleted subsequent to completion of the backup operation.

15. The method of claim 12, further comprising restoring the first snapshot, including by reading the entry associated with the data block included in the first snapshot:

in response to a first determination that the entry includes underlying data of the data block:

restoring stored data associated with the entry associated with the data block to the source system; and using the stored metadata block corresponding to the data block to determine to which file, directory, or both the data block belongs; and in response to a second determination that the entry associated with the data block includes a representation of the data block:

using the representation included in the entry to locate a location at the backup media to restore data stored at the location at the backup media to the source system; and using the stored metadata block corresponding to the data block to determine to which file, directory, or both the data block belongs.

16. The method of claim 12, wherein the determination comprises a first determination and wherein, in response to a second determination that the matching identifier is included in the deduplication data, further comprising:

determining, at the source system, that the data block has already been written to the backup media; and sending, from the source system, to the backup storage a representation of the data block to be stored as the entry associated with the data block in the first snapshot on the backup media at the backup storage, wherein the representation of the data block comprises associating data to a location at the backup media to which the data block was previously written, wherein the representation of the data block is determined based at least in part on information stored in the deduplication data, wherein the data block was previously written to the location at the backup media for a second snapshot of the plurality of snapshots.

17. The method of claim 16, wherein the representation of the data block comprises at least one of a hard link or a soft link.

18. The method of claim 12, wherein the metadata block comprises an inode.

19. A computer program product, the computer program product being embodied in a non-transitory computer readable storage medium and comprising computer instructions for:

receiving an indication to perform a backup operation on a plurality of storage areas of a source system;

in response to the indication, performing the backup operation including by generating a plurality of snapshots corresponding to respective ones of the plurality of storage areas associated with the backup operation;

maintaining, at the source system, deduplication data corresponding to one or more data blocks that have already been written to backup media during the backup operation, wherein the deduplication data comprises a plurality of identifiers corresponding to respective ones of data blocks that have already been written to the backup media; and using the deduplication data, at the source system, to deduplicate backup data across the plurality of snapshots associated with the backup operation, wherein to use the deduplication data comprises to compare, at the source system, an identifier associated with a data block to back up in a first snapshot included in the plurality of snapshots to the plurality of identifiers, wherein in response to a determination that a matching identifier is not found in the plurality of identifiers:

determining, at the source system, that the data block has not already been written to the backup media;

sending, from the source system, to a backup storage underlying data of the data block to be stored as an entry associated with the data block in the first snapshot at the backup media at the backup storage; and sending, from the source system, to the backup storage a metadata block corresponding to the data block, wherein the metadata block is to be stored in the first snapshot at the backup media at the backup storage, wherein the metadata block is configured to be used to determine to which file or directory, or both, the data block belongs.

20. The computer program product of claim 19, further comprising computer instructions for:

in response to a first determination that the entry includes underlying data of the data block:

restoring stored data associated with the entry associated with the data block to the source system; and using the stored metadata block corresponding to the data block to determine to which file, directory, or both the data block belongs; and in response to a second determination that the entry associated with the data block includes a representation of the data block:

using the representation included in the entry to locate a location at the backup media to restore data stored at the location at the backup media to the source system; and using the stored metadata block corresponding to the data block to determine to which file, directory, or both the data block belongs.

* * * * *